Feb. 9, 1932.  R. E. McKENZIE  1,844,474
POTATO PLANTER
Filed May 11, 1929
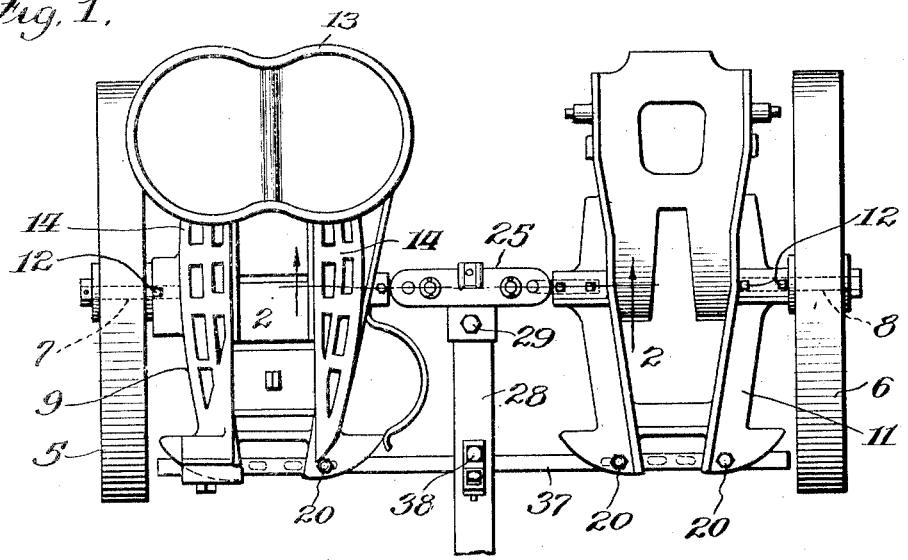
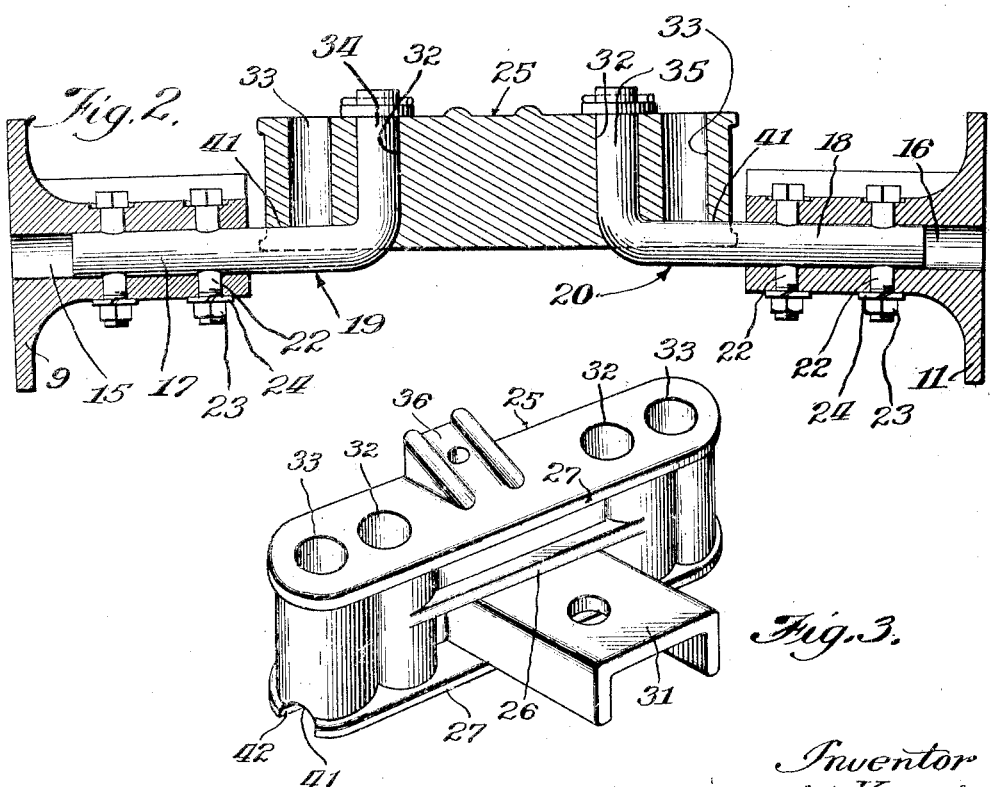
Inventor
Ralph E. McKenzie
By Williams, Bradbury, McCaleb & Hinkle
Attys.

Patented Feb. 9, 1932

1,844,474

UNITED STATES PATENT OFFICE

RALPH E. McKENZIE, OF LA CROSSE, WISCONSIN, ASSIGNOR, BY MESNE ASSIGNMENTS, TO OLIVER FARM EQUIPMENT COMPANY, A CORPORATION OF DELAWARE

POTATO PLANTER

Application filed May 11, 1929. Serial No. 362,334.

My invention relates to potato planters and more particularly to improvements therein whereby a plurality of standard single row planters are united to form a unitary planter which will plant a plurality of rows simultaneously.

One object of my invention is the provision of means for thus uniting and combining two standard single row planters without the necessity of rebuilding them, and further to permit their being thus united and again separated for operation independently in a brief period of time and with the use of a minimum amount of special parts.

The value of thus combining two standard planters is obvious, for example, in communities where the planting season is relatively short, the planting must be done as quickly as possible and with the least possible expense and labor.

A common fault in uniting planters, which I have sought to overcome, is the flexing and sagging of the intermediate portion connecting the axles which not only throws the planters out of alignment but also makes a considerable variation in the distance between the rows.

A further object of my invention is the provision of mechanism for uniting two standard planters to provide a plurality of adjustments of the distance between the two rows.

In the accompanying drawings, which illustrate a specific embodiment of my invention;

Fig. 1 is a plan view of two standard potato planters made into a unit according to my invention, the hopper, guards and certain other elemnts of the right-hand planter being omitted to reveal its frame construction;

Fig. 2 is a vertical section along the coupling mechanism taken on the line 2, 2 of Fig. 1; and Fig. 3 is a perspective of the tie member.

I have not attempted to illustrate the details of the planters themselves, as they may be of any suitable or standard construction.

In Fig. 1 I have shown somewhat diagrammatically a pair of combined planters, each retaining its respective outer wheel 5, 6 rotatably mounted on their respective outer stub axles 7, 8 rigidly secured in frames 9, 11 by bolts 12. The frames 9 and 11 are of course identical.

The inner stub axles of the respective planters have been removed from their respective bores 15, 16 and have been replaced by my special L-shaped stub axles 19, 20, with their horizontal legs 17 and 18 respectively inserted in bores 15, 16 and secured by bolts 22 (corresponding to the bolts 12) and with their usual nuts 23 and lock washers 24. The special stub shafts 19 and 20 are fixedly joined by a tie member casting 25, having vertical holes 32, 32 for receiving the upstanding legs 34, 35 of the special stub axles 19, 20. The vertical dimension of the tie member through which the holes 32 extend is sufficient to provide a tight and sturdy brace against the downward sagging of the stub axles.

The tie member is reenforced with suitable ribs 26 and flanges 27 to withstand the horizontal stresses caused by traction on the draw bar 28, which is secured by a bolt 29 to the downwardly facing channel extension 31. A pair of outer vertical holes 33 paralleling the inner pair 32 provide an alternate position for the stub axles 19 and 20 when the planters are to be spaced farther apart. An intermediate adjustment can be effected by inserting the stub axle 19 in the inner hole 32 and the other stub axle 20 in the other hole 33. The driver's seat, which is usually arranged centrally between the wheels of the standard single planter, is preferably placed between the two planters when they are combined into a pair as above described. For this purpose a suitable bracket 36 may be incorporated in the casting of the tie member 25 to provide means to which the lower end of the used strap iron seat support may be secured.

The forward ends of the frames 9, 11 are rigidly and adjustably connected and spaced by a forward cross bar 37 by bolts 20. The draw bar 28 at the point where it crosses over the forward cross bar 37, is secured thereto by a suitable bolt 38. The special stub axles 19, 20, the tie member 25, the draw bar 28, and the front cross bar 37 thus, in effect, unite with the frames 9, 11 of the respective planters to form a single unitary frame for the combined machine in such a manner as to prevent sagging at the center or the horizontal turning of the individual frame members. The use of the L-shaped stub axles and the tie member 25 much better prevents the downward sagging at the middle than would be the case if a single length of straight axle rod were used to bridge the same distance with its ends fixed in the bores 15, 16.

By a close examination of Fig. 2 it will be observed that the angle of the stub axles is slightly greater than 90° and that the upper edge 41 of the grooves 42 in which the portions 17 and 18 have bearing engagement makes a slight angle with the horizontal so that the wheels 5 and 6 actually incline slightly inwardly at the bottom or, in other words, having a slight pitch. This causes the combined planters to better resist lateral sliding action.

The width of the grooves 42 at the outer ends, as shown in Fig. 3, is slightly greater than the diameter of the stub axles to permit an adjustment of the front ends of frames 9 and 10 on the cross bar 37 to give a slight gather or tow to the wheels if desired, which affords easy operation. Elongated holes 43 through the bar 37 facilitate such adjustment.

Although I have described only the specific construction illustrated, I contemplate it may be modified in many respects without departing from the spirit and scope of the invention.

I claim as my invention:

1. In a potato planter, a pair of planter units each having a frame with means at each lateral side for receiving a stub axle, the respective frames being placed side by side with said axle receiving means in alinement, wheel supporting stub axles mounted in the outer of said receiving means, supporting wheels thereon, stub axles mounted in the inner of said receiving means, the latter stub axles having angularly disposed portions, and a tie member having spaced bearings receiving said angularly disposed portions of the stub axles for interconnecting the inner sides of said frames and bracing them against sagging.

2. In a potato planter, a pair of planter units each having a frame with means at each lateral side for receiving a stub axle, the respective frames being placed side by side with said axle receiving means in alinement, wheel supporting stub axles mounted in the outer of said receiving means, supporting wheels thereon, stub axles mounted in the inner of said receiving means, the latter stub axles having angularly disposed portions, a tie member having spaced bearings receiving said angularly disposed portions of the stub axles for interconnecting the inner sides of said frames and bracing them against sagging, and a forwardly extending draw bar secured to said tie member.

3. In a potato planter, a pair of planter units each having a frame with means at each lateral side for receiving a stub axle, the respective frames being placed side by side with said axle receiving means in alinement, wheel supporting stub axles mounted in the outer of said receiving means, supporting wheels thereon, stub axles mounted in the inner of said receiving means, the latter stub axles having vertically disposed portions, a tie member having spaced vertical bearings receiving said vertically disposed portions of the stub axles for interconnecting the inner sides of said frames and bracing them against sagging, a forwardly extending draw bar secured to said tie member, and a cross member uniting and spacing said frames forwardly of said receiving means, the draw bar intersecting the cross bar, and means for clamping them together at the intersection.

4. As an article of manufacture, a tie member for uniting opposed stub axles in juxtaposed planters or the like, upwardly extending portions formed on said axles, said tie member comprising a body portion having at each end a vertically extending bore, a horizontal reenforcing flange along the upper edge of the body connecting the ends, a horizontal reenforcing flange extending along the bottom of the body and connecting the ends, and a downwardly facing channel member formed in the bottom of the body and extending transversely thereof, for the purpose described.

5. In a potato planter, a plurality of planter frames disposed side by side, a tie member between said frames, stub axles for said frames having their inner ends extending through said tie member and having their outer ends rigidly secured within openings in said frames, and means on said tie member for securing a draw bar thereto.

6. In a potato planter, a plurality of planter frames, a tie member between said frames, stub axles rigidly anchored to said frames, vertically extending portions on the inner ends of said axles, said axles being rigidly secured to said tie member relative to a vertical plane, and means on said tie member for securing a draw bar thereto.

7. In a potato planter, two laterally spaced planter frames, a tie member between said frames, stub axles rigidly anchored to said frames, vertically extending portions on the inner ends of said axles, said vertical portions being rigidly secured to said tie member relative to a vertical plane, and a channel portion on said tie member for securing a draw bar thereto.

8. In a potato planter, two laterally spaced planter frames, wheels for supporting said frames, a tie member between said frames, stub axles rigidly anchored to said frames vertically extending portions on the inner ends of said axles extending through said tie member, means for rigidly securing said portions to said tie member against relative movement in a vertical plane, a channel portion on said tie member, a draw bar and means for securing the draw bar to said channel portion.

9. In a potato planter, two laterally spaced planter frames, wheels for supporting said frames, an adjustable tie member between said frames, axles rigidly anchored to said frames and having vertically extending portions on their inner ends extending upwardly through openings in said tie member, means for securing said extensions to said member against relative movement in a vertical plane, a draw bar secured to said tie member, and means forwardly of said tie member securing the forward ends of said frames to said draw bar.

10. In a potato planter, two laterally spaced planter frames, wheels for supporting said frames, a tie member between said frames, reinforcing ribs and flanges on said tie member, a vertical web portion forming the central part of said tie member, stub axles having their inner ends extending through said tie member and their outer ends rigidly secured to said frames, and an integral channel portion on the tie member for securing a draw bar thereto.

11. In a potato planter, two laterally spaced planter frames, disposed side by side, wheels for supporting said frames at their outer edges, connecting means for the adjacent inner sides of said frames comprising a coupling member and L-shaped stub axles secured through vertical openings therein, the angle of said axles being slightly greater than 90°, causing the outer ends to incline downwardly.

12. In a potato planter, two laterally spaced planter frames, disposed side by side, wheels for supporting said frames at their outer edges, connecting means for the adjacent inner sides of said frames comprising a coupling member and L-shaped stub axles secured through vertical openings therein, the angle of said axles being slightly greater than 90°, causing the outer ends to incline downwardly, means adjustably connecting the front ends of the planter frames in spaced relation and a draw bar securing both the said connecting means together, thereby forming a rigid unitary frame structure.

In witness whereof, I hereunto subscribe my name this 22nd day of Apr., 1929.

R. E. McKENZIE.